(No Model.) 2 Sheets—Sheet 1.

W. M. WALLACE.
MANUFACTURING GLASS ARTICLES.

No. 278,472. Patented May 29, 1883.

Witnesses:
T. C. Brecht
O. H. Herring

Inventor
William M. Wallace (No Model.) 2 Sheets—Sheet 2.
W. M. WALLACE.
MANUFACTURING GLASS ARTICLES.
No. 278,472. Patented May 29, 1883.
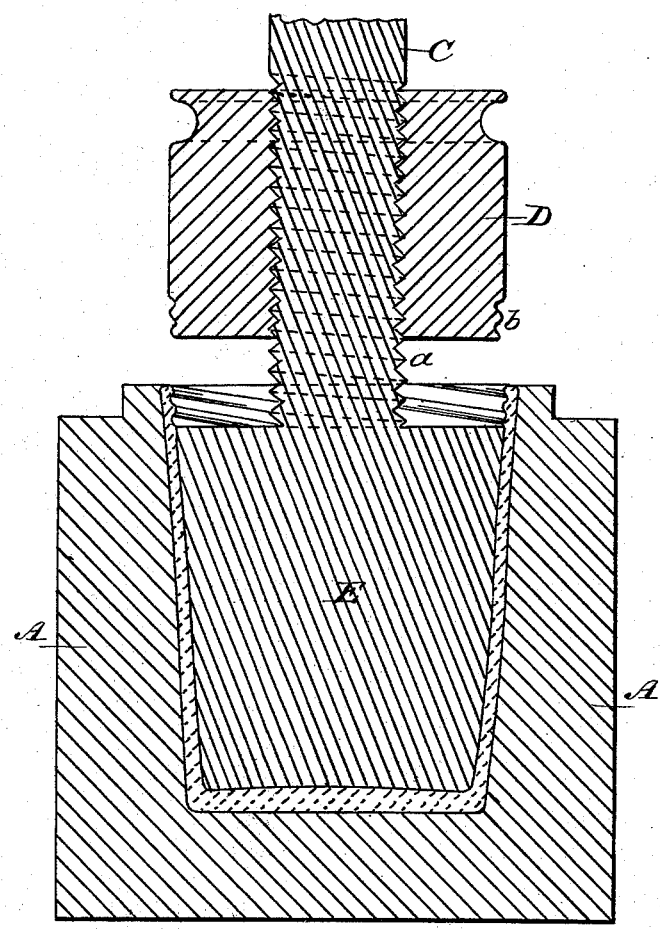
Fig. 2.
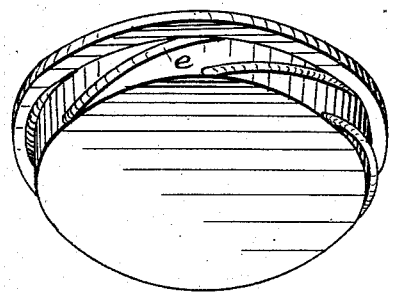
Fig. 4.
Fig. 5.
Witnesses:
T. C. Brecht
O. H. Herring
Inventor:
William M. Wallace

UNITED STATES PATENT OFFICE.

WILLIAM M. WALLACE, OF BRIDGEPORT, OHIO.

MANUFACTURING GLASS ARTICLES.

SPECIFICATION forming part of Letters Patent No. 278,472, dated May 29, 1883.

Application filed April 28, 1883. (No model.)

*To all whom it may concern:*

Be it known that I, WM. M. WALLACE, a citizen of the United States, residing at Bridgeport, Belmont county, Ohio, have invented certain new and useful Improvements in Devices for the Manufacture Glass Articles, of which the following, when taken in connection with the accompanying drawings, forms a clear and exact description.

My invention relates to the manufacture of glass jelly-tumblers, pickle-jars, and all pressed articles of glass where a screw-joint is required or necessary to join the body and cover together by having the lid or cover to interlock on the inside; and to this end my invention consists of a plunger of the required or desired shape for forming the article, having the portion of its body which forms the main cavity plain and one solid piece, and another portion provided with projections or depressions for forming a thread on the inner portion of the article, said part being movable on the main stem of the plunger, so that it can be retracted from the article prior to the withdrawal of the plunger proper, whereby the upper portion of the article will not be disturbed, or the screw-threads formed therein will not be distorted or impaired.

My invention consists, further, in forming screw-threads, inclines, lugs, or cavities on the inner upper edge of a glass article, and a corresponding cover having lugs, screw-threads, or cavities formed thereon to register with the screw-threads, lugs, or cavities on the inner side of the main body of the article, so that the cap or cover will fit within the cavity of the article.

Figure 1:
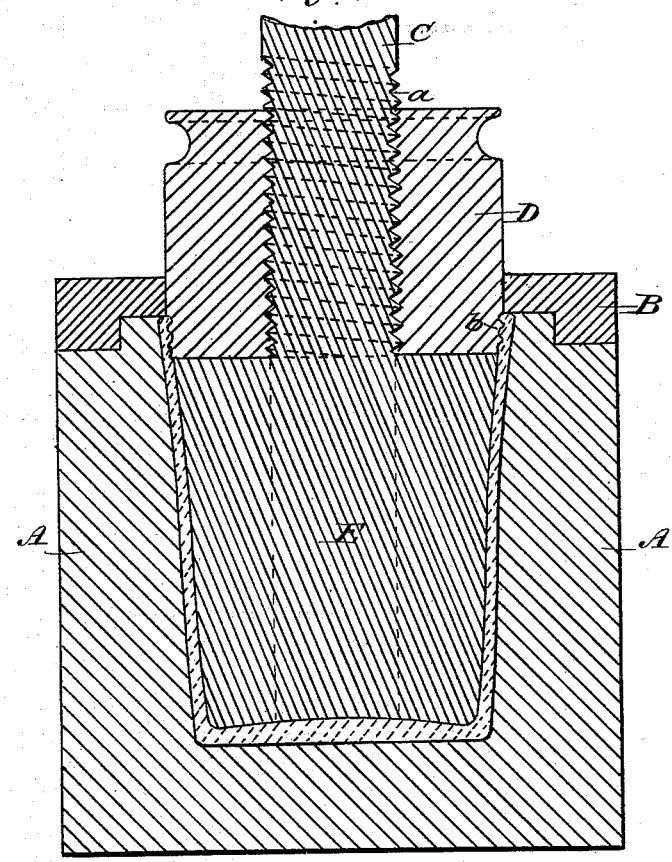
Figure 3:
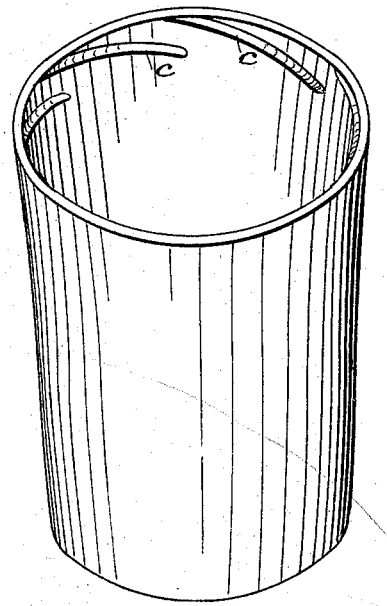

Referring to the drawings, Figure 1 is a vertical section showing the plunger in position as having formed the article. Fig. 2 is a vertical section showing the plunger within the mold, but having the movable portion or portions which form the screw-threads or lugs in an elevated position. Fig. 3 is a perspective view of a jelly-glass. Fig. 4 is a perspective view of the cover. Fig. 5 is a side view of the cover.

In the construction of jelly-glasses, pickle-jars, and vessels of like character made from glass, it is the usual custom to form on the outside of the neck or opening screw-threads, inclines, lugs, or depressions to register with screw-threads, lugs, or inclines on the inside of the glass cover or lid, thus making an article which has the cover locking on the outside. As a result of this construction, the increased area of the covers, in order to overlap, have to be made stronger in proportion, in order to resist the force exerted in the outward direction by the screw or lugs on the neck of the article, and also to resist the action of the pressure from gases generated in the material stored within the vessel hermetically. Furthermore, the cost of manufacture is greatly increased, owing to the large amounts of glass used in making the heavy caps, and when finished the projecting edge of the cap gives an unsightly and awkward appearance to the article. To obviate all these defects is the object and spirit of my invention.

A indicates the body of the mold, which may be in two or more parts or in one piece, having the usual article-forming cavity therein.

B is the mold-ring of the usual construction.

C is the plunger, which is connected to the operating parts of any suitable press, and is operated thereby. The plunger is made in two parts or sections—an upper section, D, and lower section, E. The lower section, E, is made of any suitable or desired form, so that it can be readily withdrawn from the article and its shank is provided with a screw-thread to receive and register with corresponding screw-threads on the interior section of D, so that the latter can be moved up and down on the shank. Section D is provided on its periphery with a screw or series of inclined grooves, *b*, which form on the inside of the article the inclined ribs or projections *c*. This order may be reversed, however, so as to form inclined depressions on the inside of the article to register with the inclines, lugs, or threads formed on the outer periphery of the lid or cover shown. The object of having the plunger made in two sections—the one movable on the shank or stem of the other—is that it may release itself and ascend the moment it has formed on the glass clean-cut and well-defined screw-threads on the inside of the article, so that a cap or cover of light weight can be used.

The operation of my device is as follows:

The mold and mold-ring having been placed in proper position on the press, the required quantity of molten glass is introduced into the mold and the plunger brought down, as shown in Fig. 1, the upper section of the plunger having been previously screwed down against the lower section. After the pressure has been applied, and before the glass in the mold is set or hardened, the upper section is screwed up from the article before the lower section is moved, so that the article will not become disturbed when the upper section is being withdrawn. By this means I am enabled to form screw-threads, inclines, lugs, or depressions for the reception of caps or lids fitting on the inner side of the articles produced at the expense of very little time or labor. The upper section of the plunger may be provided with suitable devices for turning it automatically or otherwise on the threaded stem. Various devices suitable for this purpose will readily suggest themselves to the skilled mechanic. The cap or cover for the jars, jelly-glasses, &c., is provided with screw-threads, grooves, or inclined lugs, on the outer periphery of the flange or portion that extends down into the tumbler or jar, so that when the parts are brought together and placed in position a very neat strong packing-vessel or other article is produced.

I may make the plunger in one piece and extend the screw-threaded stem entirely through the plunger, so that when the plunger is turned on the stem upward sufficient to release the screw-threads, inclines, or projections on the exterior of the upper portion of the plunger from the glass within the mold the article will be held in place in the mold, and be prevented from turning by the pressure of the lower end of the screw-threaded stem. This construction comes within the scope of my invention, and is shown in dotted lines in Fig. 1.

Having thus described my invention, what I claim, and desire to secure by Letters Patent, is—

1. A plunger for pressing glassware, composed of two sections, one of which is movable on the threaded stem of the plunger proper, the movable sections being provided with proper threads or inclines, as set forth, for forming said raised or depressed portions on the inside of the article, as set forth.

2. A plunger for pressing glass articles, having a threaded stem and a movable section adapted to be raised and lowered on said threaded stem, as and for the purpose set forth.

3. A plunger for pressing glassware, composed of an upper and lower section, the upper section being adapted to be moved up and down on the stem of the lower section, whereby the upper section may be withdrawn from the pressed articles in advance or prior to the withdrawal of the lower section, as set forth.

4. The combination of the mold and mold-ring with a movable or separable plunger, whereby the article is held in the mold during the withdrawal of a portion of the plunger.

5. As a new article of manufacture, a pressed-glass pickle-jar, jelly-glass, or other article having a screw-thread, inclines, or projections raised or depressed, or other fastening devices formed on the inside of the mouth or opening, for the purpose set forth, and a glass cover provided with locking devices adapted to fit and be secured within the opening in the article.

WILLIAM M. WALLACE.

Witnesses:
MARY BARKER,
O. H. HERRING.